(12) United States Patent
Saito et al.

(10) Patent No.: US 6,334,829 B1
(45) Date of Patent: Jan. 1, 2002

(54) DOUBLE-MESHING-TYPE SILENT CHAIN DRIVE AND SPROCKET USED THEREIN

(75) Inventors: Toyonaga Saito; Nobuto Kozakura; Koichi Ichikawa; Tsutomu Haginoya, all of Saitama-ken (JP)

(73) Assignee: Tsubakimoto Chain Co., Osaka-fu (JP)

( * ) Notice: Subject to any disclaimer, the term of this patent is extended or adjusted under 35 U.S.C. 154(b) by 0 days.

(21) Appl. No.: 09/471,403

(22) Filed: Dec. 23, 1999

(30) Foreign Application Priority Data

Dec. 24, 1998 (JP) ............................................ 10-367892

(51) Int. Cl.[7] ............................................... F16G 13/04
(52) U.S. Cl. ....................................................... 474/213
(58) Field of Search ........................... 474/85, 156, 157, 474/202, 212, 213–218, 148

(56) References Cited

U.S. PATENT DOCUMENTS

| | | | | |
|---|---|---|---|---|
| 1,816,473 A | * | 7/1931 | Dull et al. ................... 474/157 |
| 1,919,768 A | * | 7/1933 | Bradt ...................... 474/213 X |
| 1,956,942 A | * | 5/1934 | Belcher et al. ......... 474/213 X |
| 2,669,879 A | * | 2/1954 | Pierce ....................... 474/217 |
| 4,758,210 A | * | 7/1988 | Ledvina ..................... 474/212 |
| 5,419,743 A | * | 5/1995 | Takeda et al. ............. 474/157 |
| 5,445,570 A | | 8/1995 | White ......................... 474/213 |
| 5,551,925 A | * | 9/1996 | Mott et al. .................... 474/85 |
| 5,967,926 A | * | 10/1999 | Kozakura et al. ........... 474/213 |
| 5,989,140 A | * | 11/1999 | Ichikawa et al. ....... 474/212 X |
| 6,142,902 A | * | 11/2000 | Ichikawa et al. ........... 474/212 |

FOREIGN PATENT DOCUMENTS

| | | |
|---|---|---|
| GB | 1 358 127 | 6/1974 |
| GB | 2 214 843 | 9/1989 |
| GB | 2 270 550 | 3/1994 |

* cited by examiner

*Primary Examiner*—Charles A Marmor
*Assistant Examiner*—Roger Pang
(74) *Attorney, Agent, or Firm*—Armstrong, Westerman, Hattori, McLeland & Naughton, LLP

(57) ABSTRACT

A double-meshing-type silent chain of a silent chain drive includes link plates having the identical side profile. Each link plate has two meshing teeth and a flat back face formed opposite to the meshing teeth. Two kinds of links are alternately arranged in the longitudinal direction of the chain, while the adjacent links are connected by pins. In one kind of link, an odd number of the link plates are disposed in the width direction of the chain. In the other kind of link, an even number of the link plates are disposed in the width direction of the chain. In each link, the link plates are oriented such that the meshing teeth of link plates located at widthwise opposite ends project outwardly with respect to the chain and the meshing teeth of the remaining link plates project inwardly with respect to the chain. Various types of sprockets used for meshing with the double-meshing-type silent chain are also disclosed.

3 Claims, 16 Drawing Sheets

DOUBLE-MESHING-TYPE SILENT CHAIN DRIVE AND SPROCKET USED THEREIN

BACKGROUND OF THE INVENTION

1. Field of the Invention

The present invention relates to a double-meshing-type silent chain drive having a silent chain capable of meshing with sprockets located inside and outside the chain and also to a sprocket for use in the double-meshing-type silent chain drive.

2. Description of the Related Art

Conventionally, in some cases, a double-meshing-type silent chain capable of meshing with sprockets or toothed pulleys which are mounted on respective driven shafts located inside and outside the chain is used as a timing chain for transmitting rotational motion from the crankshaft of an engine to the cam-shaft of the engine or to the shaft of an auxiliary device such as an oil pump. A double-meshing-type silent chain is employed when driven shafts located inside and outside the chain must be rotated in opposite directions.

FIG. 17 shows a conventional double-meshing-type silent chain. In FIG. 17, an endless chain A1 meshes with a sprocket A2 located inside the chain A1 as well as with a toothed pulley A3 located outside the chain A1.

In the chain A1, links, each composed of three kinds of link plates having different shapes, are connected by pins A4. Specifically, guide link plates A5 are disposed at the widthwise outermost sides of the chain A1 as well as alternately along the longitudinal direction of the chain A1. As shown in FIG. 18, the guide link plate A5 has a straight edge portion a formed at the inner circumferential side of the chain A1 and two small meshing teeth b which are formed at the outer circumferential side of the chain A1 to be located at longitudinally opposite end portions of the guide link plate 5. The small meshing teeth b mesh with the toothed pulley A3.

A link plate A6 is pin-connected with adjacent guide link plates A5 at opposite end portions thereof such that the link plate A6 is in contact with inside faces of the guide link plates A5. The link plate A6 has two meshing teeth c formed at the inner circumferential side of the chain A1 so as to mesh with the sprocket A2, as well as two small meshing teeth b formed at the outer circumferential side of the chain A1 so as to mesh with the toothed pulley A3.

Plates A7 and A8 each have two meshing teeth c formed at the inner circumferential side of the chain A1 so as to mesh with the sprocket A2, as well as a flat back face d formed opposite to the meshing teeth c.

Notably, the meshing teeth c formed at the inner circumferential side of the chain A1 and the teeth of the sprocket A2, which mesh with the meshing teeth c, employ a standard tooth profile. By contrast, the meshing teeth b formed at the outer circumferential side of the chain A1 and the teeth of the toothed pulley A3, which mesh with the meshing teeth b, employ a non-standard tooth profile.

The above conventional double-meshing-type silent chain employs three kinds of link plates having different shapes. Thus, in a step of manufacturing plates, link plate dies corresponding to the different link plate shapes must be used. Also, in an assembling step, a large number of kinds of component parts must be handled and controlled. As a result, manufacturing cost is high.

Also, since the profile of the meshing teeth formed at the outer circumferential side of the chain is smaller than the standard tooth profile, when a large load torque acts on the toothed pulley located outside the chain, the toothed pulley disengages from the chain and slips along the chain. Thus, a maximum torque that can be transmitted to the toothed pulley is smaller than that which can be transmitted to the sprocket located inside the chain. This significantly limits the selection of a device to be driven through engagement with the outer circumference side of the chain.

Further, the guide link plate has no meshing teeth at the inner circumferential side of the chain, but instead has the straight edge portion at the inner circumferential side of the chain. Consequently, the guide link plate is relatively heavy, causing an increase in the weight of the entire chain. This causes an increase in impact energy generated due to meshing engagement between the chain and the sprocket or between the chain and the toothed pulley when the chain travels, resulting in an increase in working noise.

Also, a heavy chain weight causes an increase in tension derived from a centrifugal force produced when the chain travels, accelerating wear of a shoe surface of a chain guide or the like as well as elongation of the chain. Particularly, when such a double-meshing-type silent chain is used as a timing chain for an engine, timing drive of the engine may be adversely effected.

SUMMARY OF THE INVENTION

An object of the present invention is to provide a double-meshing-type silent chain drive which solves the above-mentioned problems involved in the prior art, enables a reduction in manufacturing cost through improvement of productivity, and enables transmission of a strong driving force between a double-meshing-type silent chain and a sprocket meshed with the chain along the outer circumference thereof.

Another object of the present invention is to provide a sprocket for meshing with the double-meshing-type silent chain, which is capable of suppressing chain vibration while maintaining high transmission efficiency.

To achieve the above object, the present invention provides a double-meshing-type silent chain drive comprising a double-meshing-type silent chain and a sprocket for meshing with the chain. The chain includes link plates having the identical side profile. Each link plate has two meshing teeth and a flat back face formed opposite to the meshing teeth. Two kinds of links are alternately arranged in the longitudinal direction of the chain, while the adjacent links are connected by pins. In one kind of link, an odd number of the link plates are disposed in the width direction of the chain. In the other kind of link, an even number of the link plates are disposed in the width direction of the chain. In each link, the link plates are oriented such that the meshing teeth of link plates located at widthwise opposite ends project outwardly with respect to the chain and the meshing teeth of the remaining link plates project inwardly with respect to the chain.

In the double-meshing-type silent chain of the present invention, all of the link plates have the identical side profile. Also, the outermost link plates of each link are oriented such that their meshing teeth project outwardly with respect to the chain. Thus, these outwardly projecting meshing teeth are meshed with a sprocket disposed outside the chain to thereby transmit power between the chain and the sprocket.

In each link, all the link plates except the outermost link plates are oriented such that the meshing teeth project inwardly with respect to the chain. These inwardly projecting meshing teeth are meshed with a sprocket disposed inside the chain to thereby transmit power between the chain and the sprocket.

Since all of the link plates have the identical side profile, the link plates can be manufactured through use of a single kind of link plate die. As compared to the case of a conventional chain of this kind composed of link plates having a plurality of side profiles, man-hours required for control of component parts can be reduced, and erroneous assembly can be prevented, thereby greatly improving productivity.

In contrast to the case of a conventional silent chain, large heavy guide plates having no teeth are not used, thereby reducing the weight of the entire chain.

Further, since meshing teeth which project outwardly with respect to the chain are profiled similarly to those which project inwardly with respect to the chain, there can be increased a torque that can be transmitted between the chain and a sprocket disposed outside the chain.

Preferably, the double-meshing-type silent chain of the present invention is such that, in each link, the meshing teeth of some link plates oriented in one direction project beyond the back faces of the remaining link plates oriented in an opposite direction.

In this case, the shoe face of a chain guide or that of a tensioner lever can be brought into slidable contact with the back faces of the plates oriented outwardly with respect to the chain, while the opposite side faces of the shoe are guided along the inside faces of the meshing teeth of the opposed outermost link plates, which meshing teeth project outwardly beyond the plate back faces.

The sprocket may be a first-type sprocket for meshing with the double-meshing-type silent chain along the outer circumference thereof, wherein a plate support face is formed in each of meshing teeth of the sprocket so as to support the back faces of the link plates which are oriented outwardly with respect to the chain, during the sprocket meshing with the link plates whose meshing teeth are oriented outwardly with respect to the chain.

In the first-type sprocket, power transmission is achieved through engagement with the meshing teeth of the outermost link plates in each link. Also, the plate support face formed in each meshing tooth of the sprocket abuts on the back faces of the link plates which are oriented outwardly with respect to the chain, to thereby partially bear a reaction force of the running chain imposed on sprocket teeth and thus improve sprocket durability. Further, the plate support faces serve as a chain guide for guiding the back faces of link plates to thereby suppress chain vibration.

Since an existing standard sprocket can be used as the first-type sprocket by machining tip portions of sprocket teeth to form the plate support face in each sprocket tooth, the first-type sprocket can be manufactured at low cost and can be used with the double-meshing-type silent chain of the present invention.

The sprocket may also be a second-type sprocket for meshing with the double-meshing-type silent chain along the outer circumference thereof, comprising a plate-back-face support element and two meshing elements. The plate-back-face support element has a cylindrical surface that abuts on the flat back faces of the link plates which are oriented outwardly with respect to the chain. The meshing elements are integrally coupled with the plate-back-face support element such that the plate-back-face support element is interposed between the meshing elements. Meshing teeth are formed on the circumferences of the meshing elements concentrically with the cylindrical surface of the plate-back-face support element so that the meshing elements can mesh with the link plates whose meshing teeth project outwardly with respect to the chain.

In the second-type sprocket, the two meshing elements have meshing teeth which are formed on the circumferences and which are profiled so as to completely mesh with outwardly projecting meshing teeth of the chain. Therefore, when the second-type sprocket is meshed with the outer circumferential side of the double-meshing-type silent chain of the present invention, a large torque can be transmitted therebetween.

Also, in the second-type sprocket, the plate-back-face support element has a continuous cylindrical surface for contact with back faces of link plates. The continuous cylindrical profile establishes continuous and smooth contact with the back faces, thereby significantly suppressing chain vibration and partially bearing a reaction force of the running chain imposed on sprocket teeth to thereby lessen sprocket teeth load. Thus, sprocket durability can be improved.

The sprocket may be a third-type sprocket for meshing with the double-meshing-type silent chain along the outer circumference thereof. The sprocket includes a meshing element having meshing teeth formed on an outer circumference thereof for meshing engagement with the meshing teeth of the link plates which are oriented inwardly with respect to the chain, and two plate-back-face support elements provided concentrically on opposite sides of the meshing element and each having a cylindrical outer surface for abutment with the flat back faces of the link plates of the chain which are oriented inwardly with respect to the chain.

When the third-type sprocket is used for mesh with the double-meshing-type silent chain along the inner circumference thereof, the meshing teeth formed on the circumference of the meshing element are in mesh with the meshing teeth of the chain which are oriented inwardly with respect to the chain to achieve power transmission between the sprocket and the chain. At the same time, the respective cylindrical outer surfaces of the plate-back-face support elements provided on opposite sides of the meshing element abut on the flat back faces of the link plates which are oriented inwardly with respect to the chain to thereby support or bear reaction from the chain.

In the third-type sprocket, while the meshing teeth of the meshing element mesh with the meshing teeth of the chain oriented inwardly with respect to the chain to achieve power transmission, the plate-end-face support elements smoothly guide and support the flat back faces of the link plates to thereby achieve the function of a chain guide. Vibrations resulting form polygonal movement of the chain can be suppressed to thereby stabilize the travel condition of the chain and lower the operation noise.

It is preferable that when the cylindrical outer surface of each of the plate-back-face support elements is in abutment with the flat back faces of the link plates, the meshing teeth of the meshing element mesh with the meshing teeth of the opposing link plates at a position offset from a meshing pitch circle of the meshing teeth of the meshing element in a radial outward direction of the sprocket. With this arrangement, the cylindrical outer surfaces of the plate-end-face support elements forcibly displace the back faces of the link plates in a radial outward direction before the meshing teeth of the meshing element mesh with the teeth of the chain. With this displacement, the meshing teeth of the sprocket mesh with the meshing teeth of the chain at a position located outside the meshing pitch circle of the meshing teeth of the sprocket.

Such meshing is particularly effective to reduce the load in the radial direction of the sprocket.

The sprocket may be a fourth-type sprocket which comprises a plate-back-face support element having a cylindrical outer surface for abutment with the flat back faces of the link plates of the chain that are oriented outwardly with respect to the chain, and two meshing elements provided concentrically on opposite sides of the plate-end-face support element and each having meshing teeth formed on an outer circumference thereof for meshing engagement with the meshing teeth of the link plates of the chain which are oriented outwardly with respect to the chain. The cylindrical outer surface of the plate-back-face support element is in abutment with the flat back faces of the link plates, and the meshing teeth of each of the meshing elements mesh with the meshing teeth of the opposing link plates at a position offset from a meshing pitch circle of the meshing teeth of the meshing elements in a radial outward direction of the sprocket.

In the fourth-type sprocket, the cylindrical outer surface of the plate-end-face support element forcibly displaces the back faces of the link plates in a radial outward direction before the meshing teeth of the meshing elements mesh with the teeth of the chain. With this displacement, the meshing teeth of the sprocket mesh with the meshing teeth of the chain at a position located outside the meshing pitch circle of the meshing teeth of the sprocket. Such meshing is particularly effective to reduce the load in the radial direction of the sprocket.

The sprocket may be a fifth-type sprocket for meshing with a double-meshing-type silent chain, which comprises two meshing elements each having teeth formed on an outer circumference thereof for meshing engagement with the meshing teeth of the link plates of the chain which are oriented outwardly with respect to the chain, a buffer-ring support element having a cylindrical outer surface and concentrically and integrally joining the two meshing elements, and a buffer ring having an inside diameter larger than the outside diameter of the buffer-ring support element and being floatingly fitted around the cylindrical outer surface of the buffer-ring support element while the buffer ring is prevented from moving in the axial direction between the two meshing elements. The buffer ring has an outer peripheral surface adapted to be in abutment with opposing flat back faces of link plates at positions in front and in rear of a meshing position at which the meshing teeth of the link plates are in mesh with the meshing teeth of the meshing elements. At the meshing position, the outer peripheral surface of the buffer ring is separated from the flat back faces of the link plates and an inner peripheral surface of the buffer ring is in abutment with the cylindrical outer surface of the buffer-ring support element.

When the fifth-type sprocket is used for meshing with the double-meshing-type silent chain along the outer circumference thereof, the outer peripheral surface of the buffer ring disposed between the meshing elements is first brought into abutment with the flat end faces of the link plates of the chain.

When the back faces of the link plates impinge on the outer peripheral surface of the buffer ring, the buffer ring is flexed or otherwise deformed in a floating manner around the buffer-ring support member to thereby absorb impact energy created at a collision. Thereafter, as the chain advances, the meshing teeth of the outermost link plates of each link reach the meshing position, the outer peripheral surface of the buffer ring disengages from the back faces of the link plates. At the meshing position, the inner peripheral surface of the buffer ring abuts on the cylindrical outer surface of the buffer-ring support element.

As the chain further advances, the outer peripheral surface of the buffer ring comes again into abutment with the opposing back faces of the link plates to thereby guide the chain such that the engagement between the meshing teeth of each meshing element and the meshing teeth of the corresponding link plates is released.

In the fifth-type sprocket, since the outer peripheral surface of the buffer ring fitted around the buffer-ring support element abuts on the back faces of the link plates in advance to the mutual meshing between the meshing teeth of the sprocket and the meshing teeth of the chain, vibrations of the chain arising from polygonal movement of the chain as the chain moves past the sprocket can be suppressed. At the same time, collision between the meshing teeth of the sprocket and the meshing teeth of the chain can be absorbed with the result that the operation noise of the chain while running is considerably reduced.

As the sprocket rotates, the buffer ring is caused to oscillate or wobble around the buffer-ring support element while it is rotating about its own axis. Thus, the position of collision between the meshing teeth of the sprocket and the meshing teeth of the chain changes at random, so that excess local wear of the tooth surfaces can be prevented.

Additionally, a lubricating oil supplied externally is guided by the buffer ring between the mutually intermeshing teeth of the chain and sprocket with the result that the teeth are protected against wear and fatigue and wear elongation of the chain is minimized.

The sprocket may be a sixth-type sprocket used for meshing with a double-meshing-type silent chain along the inner circumference thereof, which comprises a meshing element having teeth formed on an outer circumference thereof for meshing engagement with meshing teeth of link plates of the chain which are oriented inwardly with respect to the chain, two buffer-ring support elements each having a cylindrical outer surface and provided concentrically on opposite sides of the meshing element, and two buffer rings each having an inside diameter larger than the outside diameter of the buffer-ring support elements and each being floatingly fitted around the cylindrical outer surface of one of the buffer-ring support elements while the buffer rings are prevented from moving in the axial direction relative to the corresponding buffer-ring support elements. The buffer rings each have an outer peripheral surface adapted to be in abutment with opposing flat back faces of link plates at positions in front and in rear of a meshing position at which the meshing teeth of the link plates are in mesh with the meshing teeth of the meshing element. At the meshing position, the outer peripheral surface of each of the buffer rings is separated from the flat back faces of the link plates and an inner peripheral surface of each of the buffer rings is in abutment with the cylindrical outer surface of one of the buffer-ring support elements.

When the sixth-type sprocket is used for meshing with the double-meshing-type silent chain along the inner circumference thereof, the outer peripheral surfaces of the buffer rings disposed on opposite sides of the meshing element are first brought into abutment with the flat end faces of the link plates of the chain.

When the back faces of the link plates impinges on the outer peripheral surfaces of the buffer rings, the buffer rings are flexed or otherwise deformed in a floating manner around the buffer-ring support members to thereby absorb impact energy created at a collision. Thereafter, as the chain advances, the meshing teeth of the outermost link plates of each link reach the meshing position, the outer peripheral surfaces of the buffer rings disengage from the back faces of the link plates. At the meshing position, the inner peripheral surfaces of the buffer rings abut on the cylindrical outer surfaces of the buffer-ring support elements.

As the chain further advances, the outer peripheral surfaces of the buffer rings come again into abutment with the opposing back faces of the link plates and guide the chain such that the engagement between the meshing teeth of the meshing element and the meshing teeth of the corresponding link plates is released.

The sixth-type sprocket has substantially the same advantageous effects as those of the fifth-type sprocket described above.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
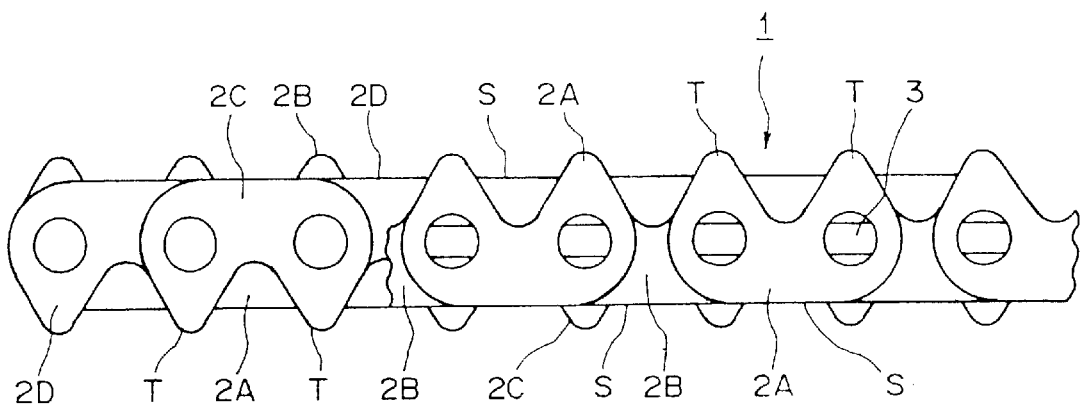
FIG. 1 is a side view showing an embodiment of a double-meshing-type silent chain according to the present invention.
Figure 2:
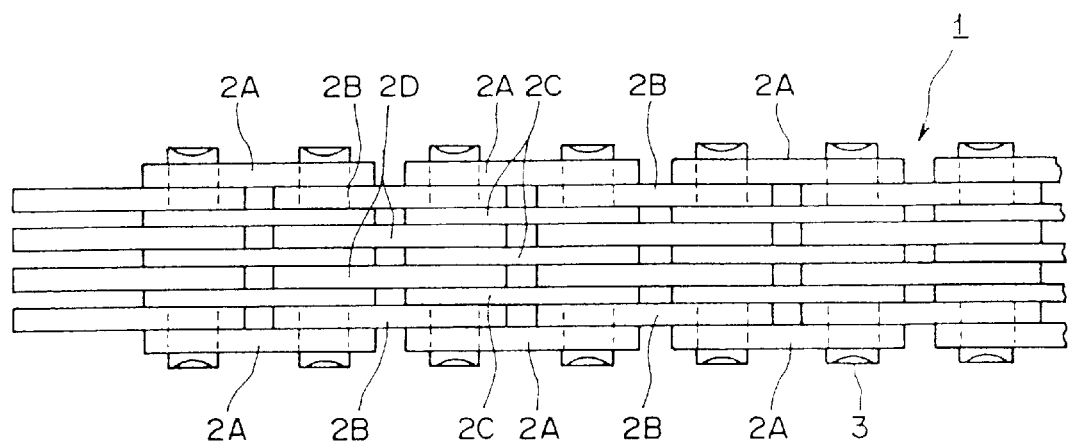
FIG. 2 is a plan view showing the double-meshing-type silent chain of FIG. 1.

Embodiments of the present invention will next be described in detail with reference to the drawings. FIG. 1 is a side view showing an embodiment of a double-meshing-type silent chain according to the present invention. FIG. 2 is a plan view of the silent chain. In FIGS. 1 and 2, a double-meshing-type silent chain (hereinafter, referred to simply as a "chain") 1 includes link plates 2A, 2B, 2C, and 2D having the identical side profile.

The link plates 2A, 2B, 2C, and 2D each have two meshing teeth T and a flat back face S formed opposite to the meshing teeth T. The meshing teeth T have a tooth profile similar to that of a standard silent chain.

In the chain 1, two kinds of links are alternately arranged in the longitudinal direction of the chain 1, while the adjacent links are connected by pins 3. One kind of link is composed of an odd number of link plates, specifically three of link plates 2C and two of the link plates 2A which are disposed such that the three link plates 2C are interposed between the two link plates 2A. The outer kind of link is composed of an even number of link plates, specifically two of the link plates 2D and two of the link plates 2B which are disposed such that the two link plates 2D are interposed between the two link plates 2B.

The links are connected endlessly, while the outermost link plates 2A and 2B are oriented such that the meshing teeth T project outwardly with respect to the chain 1 and while the link plates 2C and 2D interposed between the link plates 2A and between the link plates 2B, respectively, are oriented such that the meshing teeth T project inwardly with respect to the chain 1.

The link plates 2A and 2B, whose meshing teeth T project outwardly with respect to the chain 1, and the link plate 2D, which is present in the same link as that in which the link plate 2B is present, have the identical thickness. The link plate 2C is thinner than the link plates 2A, 2B, and 2D. Thus, a uniform tensile strength is imparted to the links.

According to the present embodiment, in each link, link plates are connected by the pin 3 such that the meshing teeth T of some link plates oriented in one direction project beyond the back faces S of the remaining link plates oriented in an opposite direction. Thus, the shoe face of a chain guide or tensioner lever can be brought into slidable contact with the back faces S of the link plates 2C and 2D oriented outwardly with respect to the chain 1, while the opposite side faces of the shoe are guided along the inner faces of the meshing teeth T of the opposed outermost link plates 2B, which meshing teeth T project outwardly beyond the plate back faces S of the link plates 2C and 2D.

Also, an unillustrated sprocket located inside and meshed with the chain 1 is guided by the link plates 2B, whose back faces S are oriented inwardly with respect to the chain 1. Specifically, the side faces of sprocket teeth are guided along the inner faces of the opposed link plates 2B. Thus, the link plates 2B serve as guide plates employed in a conventional silent chain.

Notably, in the same link, the link plates 2A (2B) and 2C (2D) may be connected by the pin 3 such that the meshing teeth T of the link plates 2A (2B) are aligned with or recessed from the back faces S of the oppositely oriented link plates 2C (2D). This feature enables a chain guide or a tensioner lever to have a shoe wider than the width of the chain 1.

Figure 3:
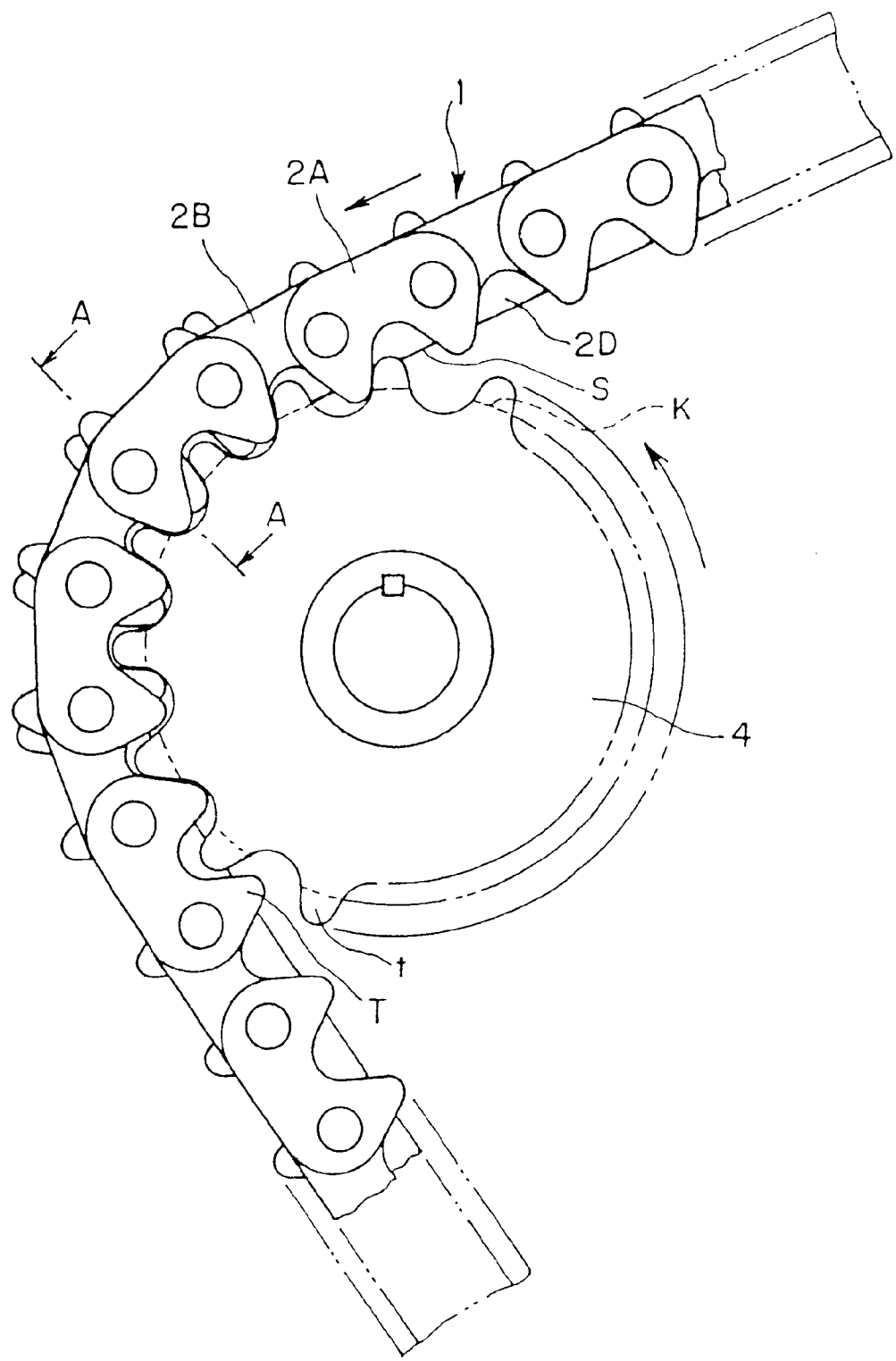
FIG. 3 is a side view showing a first embodiment of a sprocket according to the present invention for meshing with a double-meshing-type silent chain along the outer circumference thereof.
Figure 4:
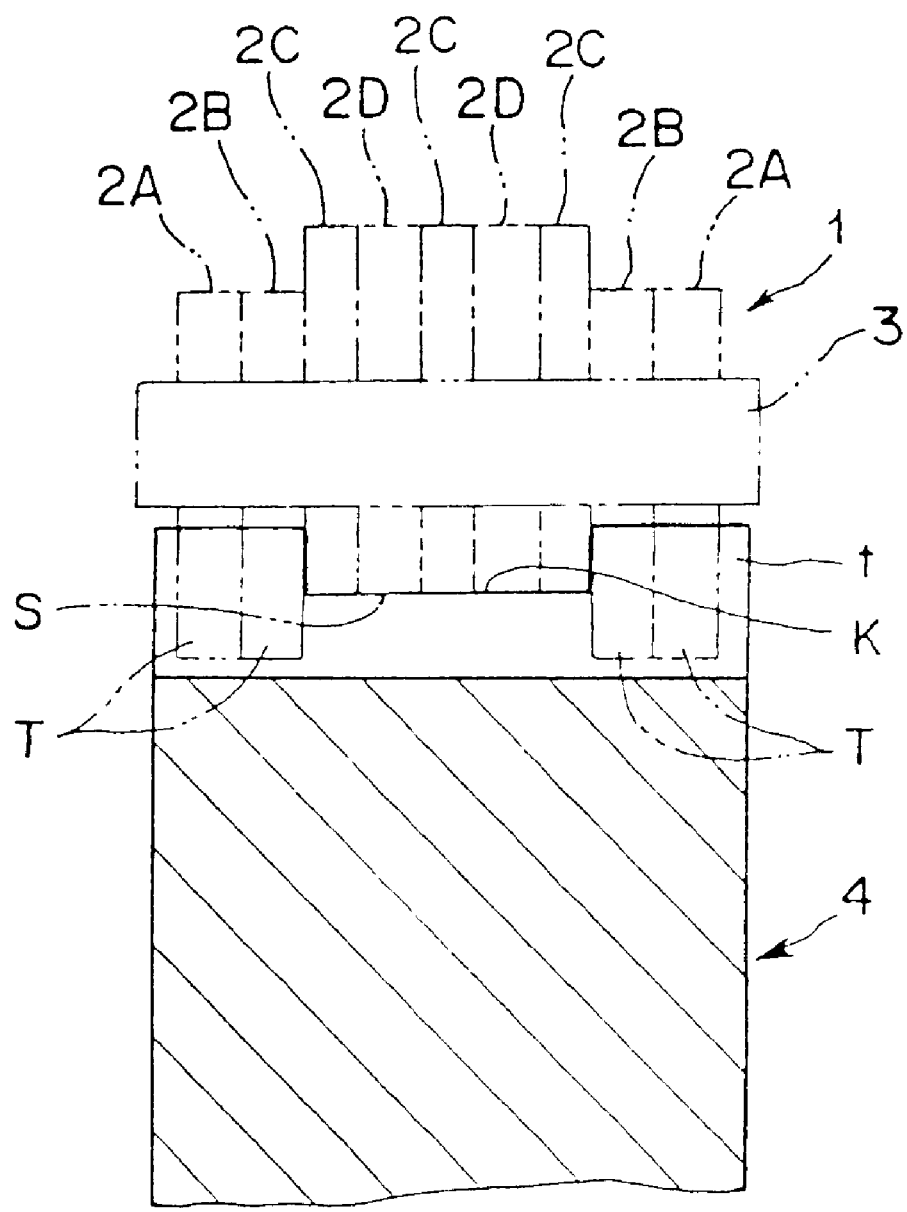
FIG. 4 is a partially sectional view taken along the line A—A of FIG. 3.

FIG. 3 is a side view showing a first embodiment of a sprocket according to the present invention for meshing with a double-meshing-type silent chain along the outer circumference thereof. FIG. 4 is a partially sectional view taken along the line A—A of FIG. 3. As shown in FIGS. 3 and 4, a sprocket 4 according to the first embodiment is disposed outside the chain 1.

Meshing teeth t of the sprocket 4 have a standard tooth profile so as to be compatible with the meshing teeth T of the chain 1. A widthwise central portion of the tip region of each meshing tooth t is cut away to form a plate support face K. The plate support face K is formed as a portion of a cylindrical surface concentric with the rotation axis of the sprocket 4.

The sprocket 4 is slightly wider than the maximum width of the chain 1. An existing standard sprocket having standard teeth for meshing with a silent chain can be readily used as the sprocket 4 by simply machining tip portions of sprocket teeth.

Portions of each meshing tooth t located at opposite sides of the plate support face K mesh with the meshing teeth T of the link plates 2A and 2B disposed at opposite sides of the chain 1, thereby transmitting torque between the chain 1 and the sprocket 4 as in the case of a conventional silent chain.

During such torque transmission, the plate support faces K abut on the back faces S of the link plates 2C and 2D to thereby serve as guides for the back faces S. At the same time, torque is partially transmitted between the chain 1 and the sprocket 4 in the form of a frictional force generated between the back faces S and the plate support faces K. Also, the plate support faces K partially bear a reaction force of the running chain 1 imposed on the sprocket teeth t, thereby contributing toward improving durability of the sprocket 4.

Figure 5:
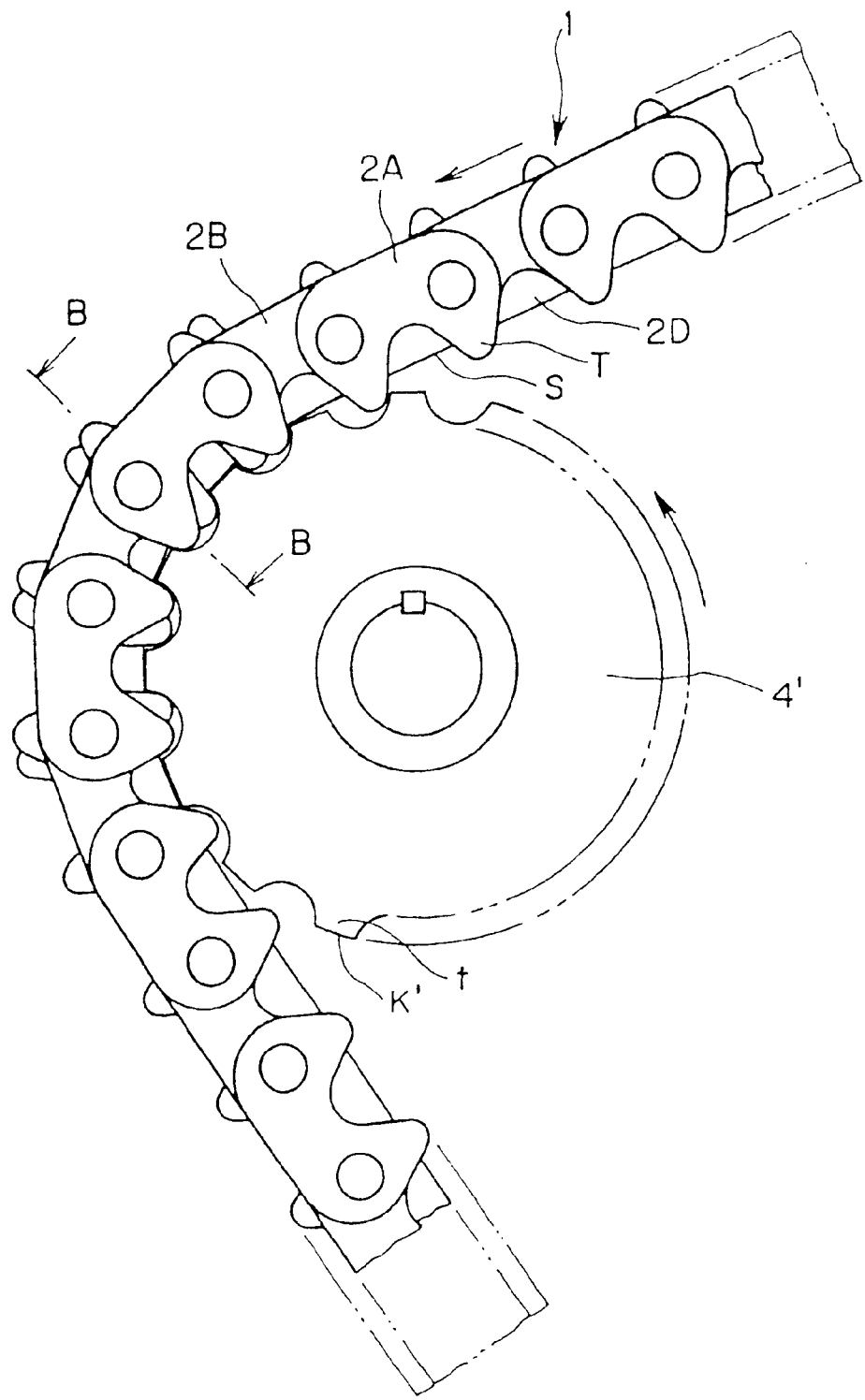
FIG. 5 is a side view showing a second embodiment of the sprocket according to the present invention for meshing with the double-meshing-type silent chain along the outer circumference thereof.
Figure 6:
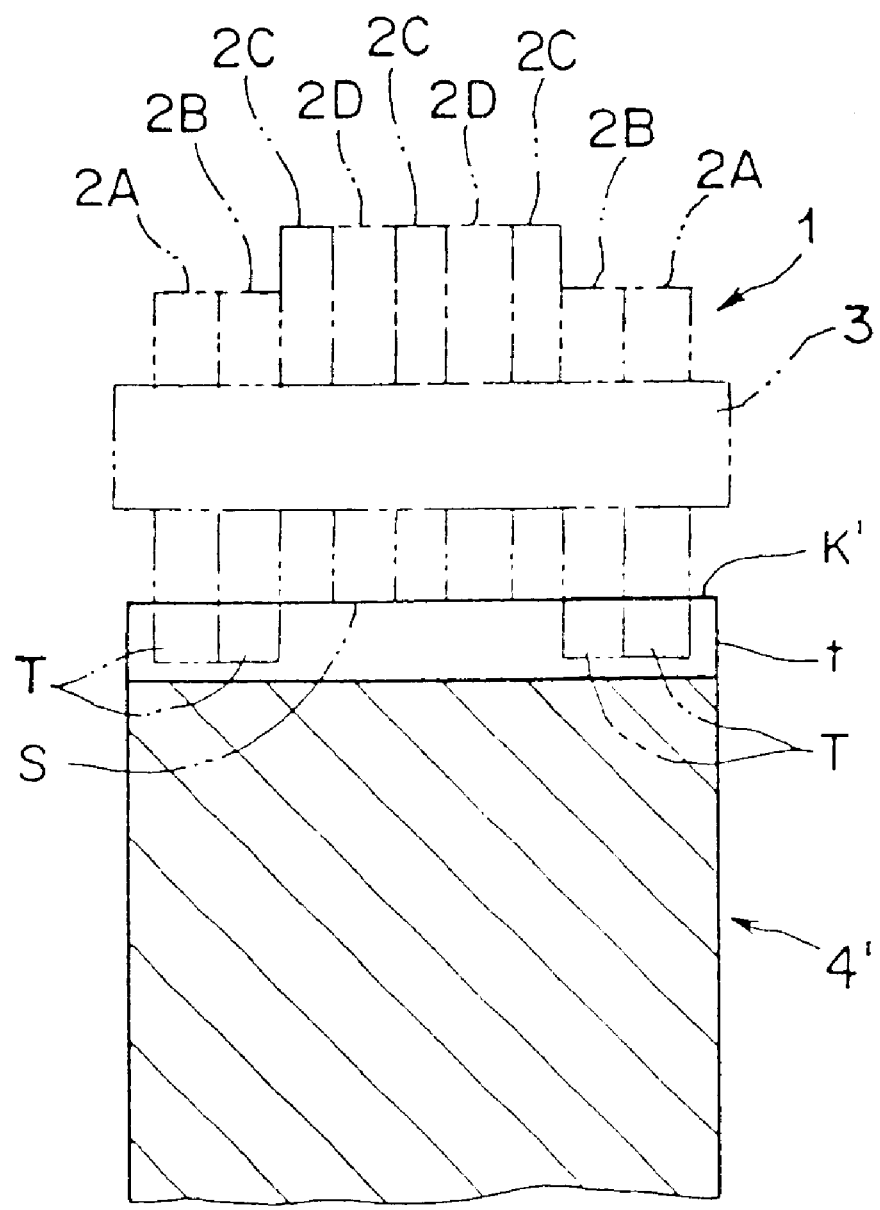
FIG. 6 is a partially sectional view taken along the line B—B of FIG. 5.

FIG. 5 is a side view showing a second embodiment of the sprocket according to the present invention for meshing with a double-meshing-type silent chain along the outer circumference thereof. FIG. 6 is a partially sectional view taken along the line B—B of FIG. 5. As shown in FIGS. 5 and 6, in a sprocket 4' according to the second embodiment, a plate support face K', which abuts on the back faces S of the link plates 2C and 2D, is formed on each of meshing teeth t of the sprocket 4' at a tip portion across the entire width of the meshing tooth t. As in the case of the sprocket 4, an existing standard sprocket having standard teeth for meshing with a silent chain can be used as the sprocket 4' by simply machining tip portions of sprocket teeth over the entire teeth width.

Figure 7:
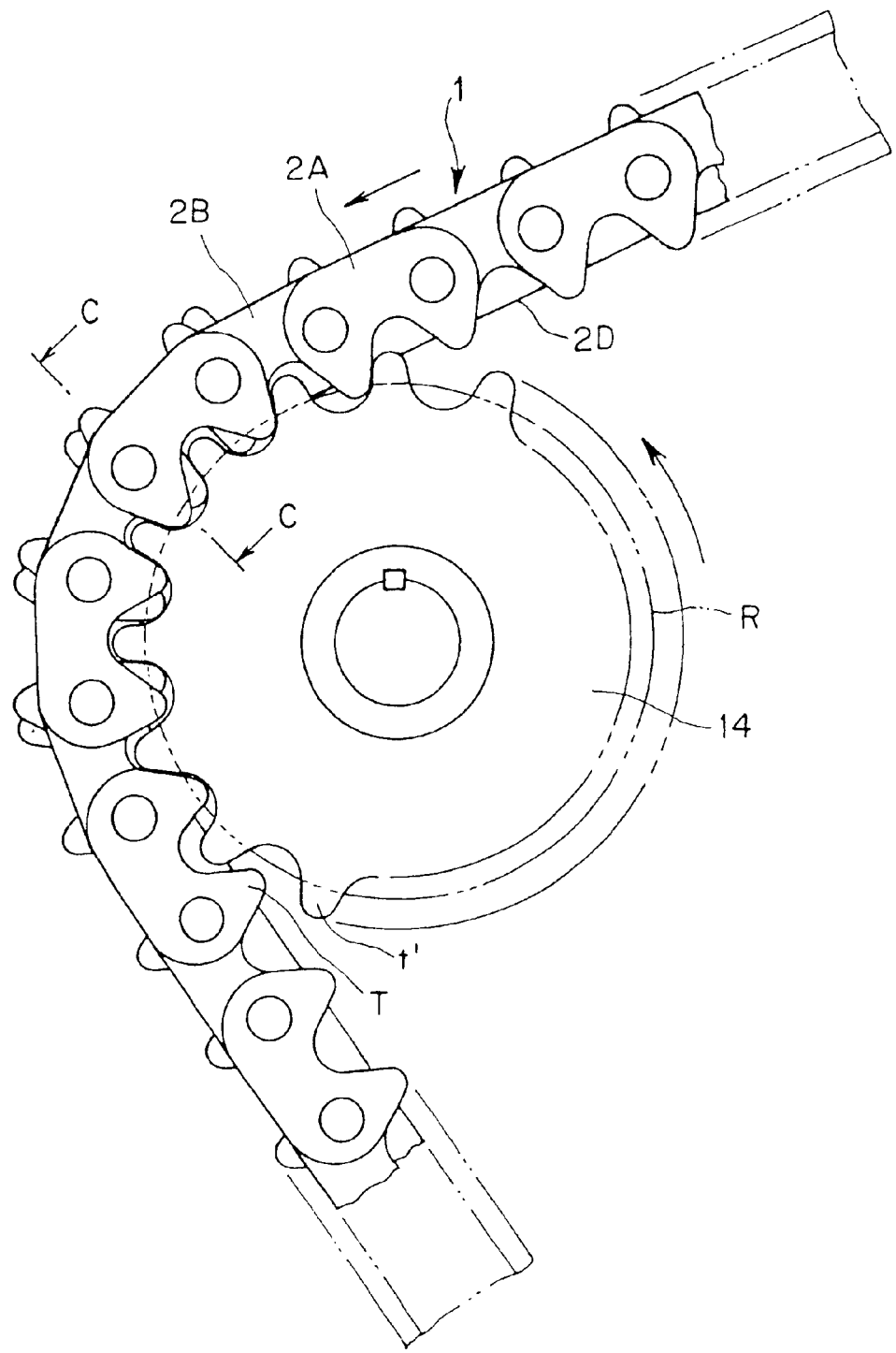
FIG. 7 is a side view showing a third embodiment of the sprocket according to the present invention for meshing with a double-meshing-type silent chain along the outer circumference thereof.
Figure 8:
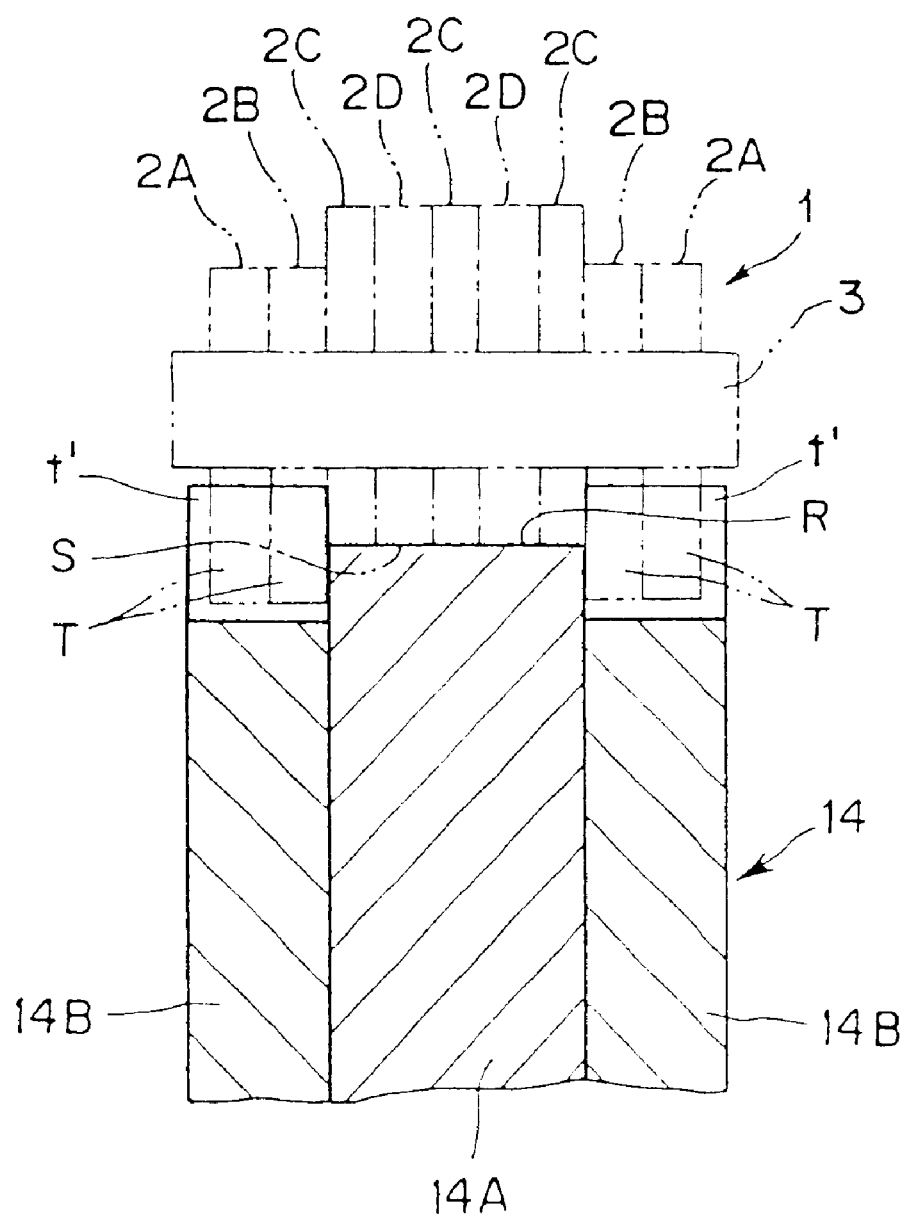
FIG. 8 is a partially sectional view taken along the line C—C of FIG. 7.

FIG. 7 is a side view showing a third embodiment of the sprocket according to the present invention for meshing with a double-meshing-type silent chain along the outer circumference thereof. FIG. 8 is a partially sectional view taken along the line C—C of FIG. 7. As in the case of the sprocket 4, a sprocket 14 according to the third embodiment is meshed with the chain 1 along the outer circumference thereof.

The sprocket 14 is composed of a plate-back-face support element 14A and two meshing elements 14B. The plate-back-face support element 14A has a cylindrical surface R for abutment with the back faces S of the link plates 2C and 2D which are oriented outwardly with respect to the chain 1. The plate-back-face support element 14A is interposed between and coaxially coupled with the two meshing elements 14B by means of, for example, unillustrated screws so that the plate-back-face support element 14A and the two meshing elements 14B rotate as a single unit.

Meshing teeth t' are formed on the two meshing elements 14B along the outer circumferences such that the meshing teeth t' of one meshing element 14B are arranged in the same phase as the meshing teeth t' of the outer meshing element 14B. The meshing teeth t' have a standard tooth profile of a conventional sprocket for use with a silent chain so as to mesh with the meshing teeth T of the outermost link plates 2A and 2B of the chain 1.

Thus, the state of engagement between a conventional silent chain and a sprocket can be similarly established between the meshing teeth t' and the outwardly projecting meshing teeth T of the chain 1 to thereby enable transmission of strong torque therebetween.

While the meshing elements 14B are meshed with the chain 1, the cylindrical surface R of the plate-back-face support element 14A is in abutment with the back faces S of the link plates 2C and 2D so as to guide and support the back faces S. At the same time, a frictional force generated between the back faces S and the cylindrical surface R establishes auxiliary torque transmission between the chain 1 and the sprocket 14.

Notably, in the sprocket 14, only the two meshing elements 14B may be made of metal such as steel, and the plate-back-face support element 14A is made of a resin material. In this case, the resin material absorbs impact which is generated between the cylindrical surface R of the plate-back-face support element 14A and the back faces S of the link plates 2C and 2D due to meshing between the sprocket 14 and the chain 1. Thus, meshing noise can be reduced.

When the plate-back-face support element 14A is to be made of a metallic material, the plate-back-face support element 14A and the meshing elements 14B may be integrally manufactured into a single unit by a method in which a metallic power is compacted and then sintered.

Figure 9:
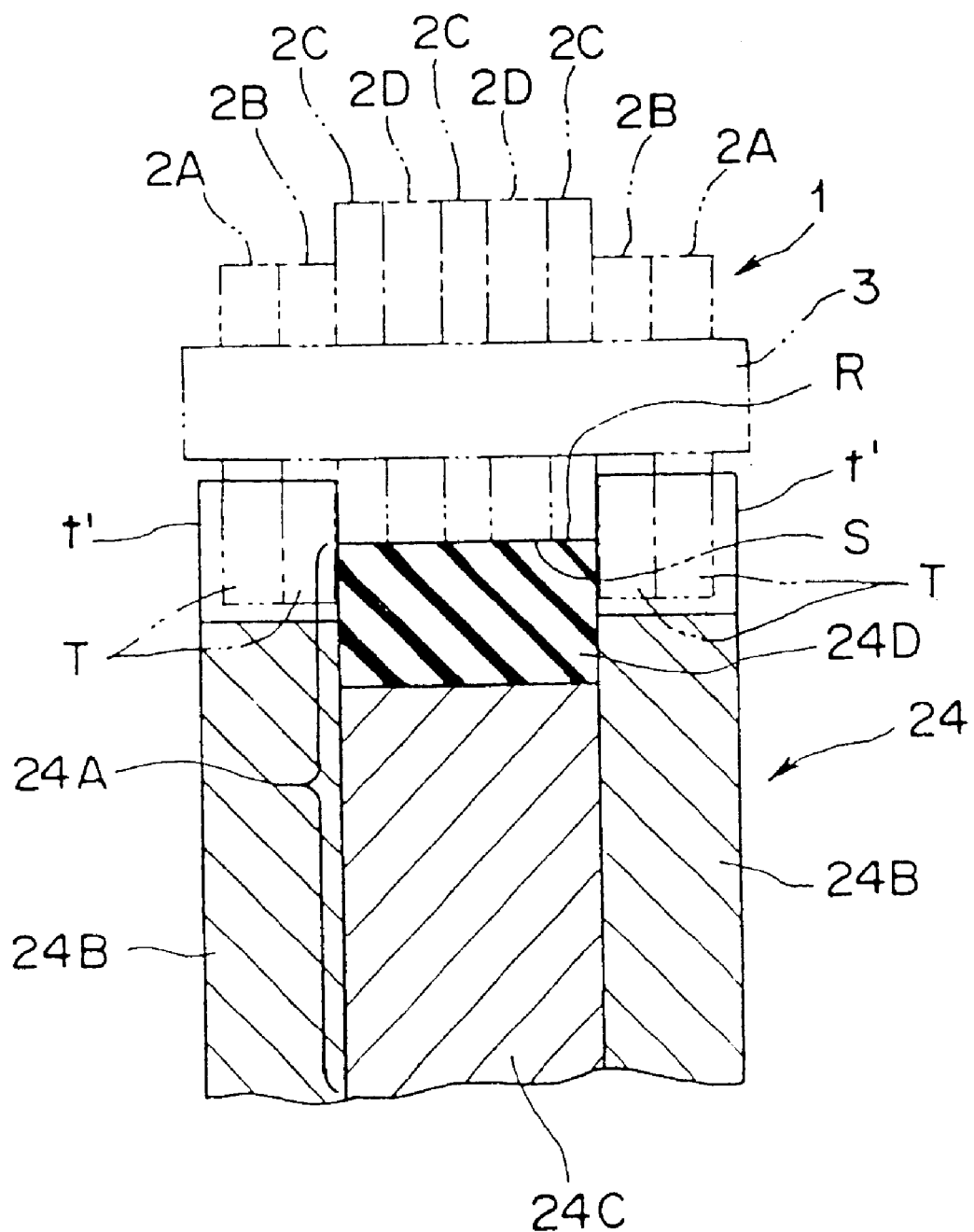
FIG. 9 is a partially sectional view showing a fourth embodiment of the sprocket according to the present invention for meshing with a double-meshing-type silent chain along the outer circumference thereof.

FIG. 9 is a partially sectional view showing a fourth embodiment of the sprocket according to the present invention for meshing with a double-meshing-type silent chain along the outer circumference thereof. A sprocket 24 of the fourth embodiment as shown in FIG. 9 is different from the sprocket 14 of the third embodiment only in the structure of a plate-back-face support element.

Specifically, in the sprocket 24, a plate-back-face support element 24A is composed of a cylindrical base 24C made of steel and a buffer ring 24D made of rubber. The buffer ring 24D has a cylindrical outer surface R for abutment with the back faces S of the link plates 2C and 2D.

Two meshing members 24B, between which the plate-back-face support element 24A is interposed, have the identical shape as that of the meshing members 14B of the sprocket 14.

While the sprocket 24 is meshed with the chain 1, the back faces S of the link plates 2C and 2D abut on the cylindrical surface R of the buffer ring 24D, thereby yielding large impact-absorbing effect as well as noise-absorbing effect. Thus, vibrations of the chain 1 can be suppressed, and large noise reduction effect can be yielded.

Since large friction is generated between the back faces S of the link plates 2C and 2D and the cylindrical surface R of the buffer ring 24D, there can be increased auxiliary torque transmission between the back faces S and the cylindrical surface R. Thus, through torque transmission between the meshing elements 24B and the link plates 2A and 2B as well as the auxiliary torque transmission, strong torque can be transmitted between the chain 1 and the sprocket 24.

In the sprocket 24, in order to reduce the number of component parts and assembling man-hours, either one of the meshing elements 24B may be integrally formed with the cylindrical base 24C, and the other meshing element 24B may be manufactured independently.

Figure 10:
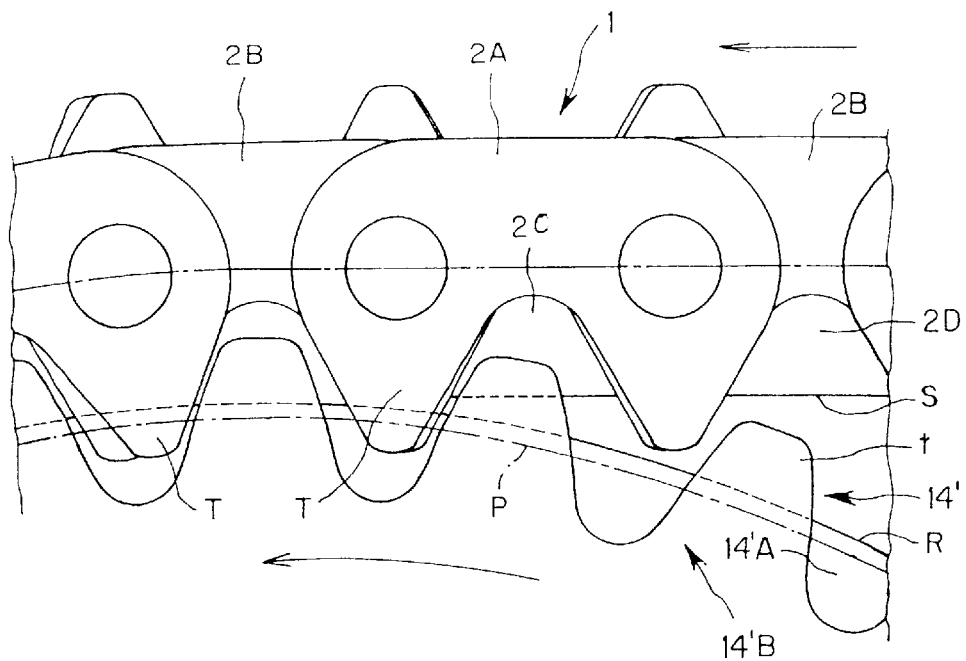
FIG. 10 is a fragmentary side view showing a fifth embodiment of the sprocket according to the present invention which is in mesh with a double-meshing-type silent chain along the outer circumference thereof.

FIG. 10 is a fragmentary side view showing a fifth embodiment of the sprocket according to the present invention for meshing with a double-meshing-type silent chain along the outer circumference thereof. A sprocket 14' is so designed as to improve the meshing characteristics of the sprocket 14 of the third embodiment shown in FIGS. 7 and 8. The structure of the sprocket 14' itself is the same as the structure of the sprocket 14.

In the sprocket 14' shown in FIG. 10, the outside diameter of the cylindrical outer surface R of a plate-back-face support element 14'A is slightly greater than that of the cylindrical surface R of the plate-back-face support element 14A of the sprocket 14 so that meshing teeth t of each meshing element 14'B is meshed with meshing teeth T of the link plates 2A, 2B at positions offset or displaced from a meshing pitch circle P of the sprocket 14' toward a radial outward side thereof when the plate-back-face support element 14'A is in abutment with the back faces S of the link plates 2C, 2D. The meshing teeth t have a standard tooth profile.

With this construction, when the chain 1 comes into meshing engagement with the sprocket 14', the cylindrical surface R forcibly displaces the back faces S of the link plates 2C, 2D in the radial outward direction. Accordingly, the most part of a load acting from the chain 1 in a radial inward direction of the sprocket 14' is born by the cylindrical surface R of the plate-back-face support element 14'A while being in abutment with the back faces S of the link plates 2C, 2D.

As a result, loads on the meshing teeth T of the link plates 2A, 2B and the meshing teeth t of the sprocket 14' are decreased, and the force acting between the meshing teeth t of the sprocket 14' and the meshing teeth T of the link plates 2A, 2B can be effectively used for power transmission between the sprocket 14' and the chain 1.

Thus, wear of the meshing teeth t and the meshing teeth T is decreased, thereby increasing the durability of the sprocket 14' and the chain 1.

Figure 11:
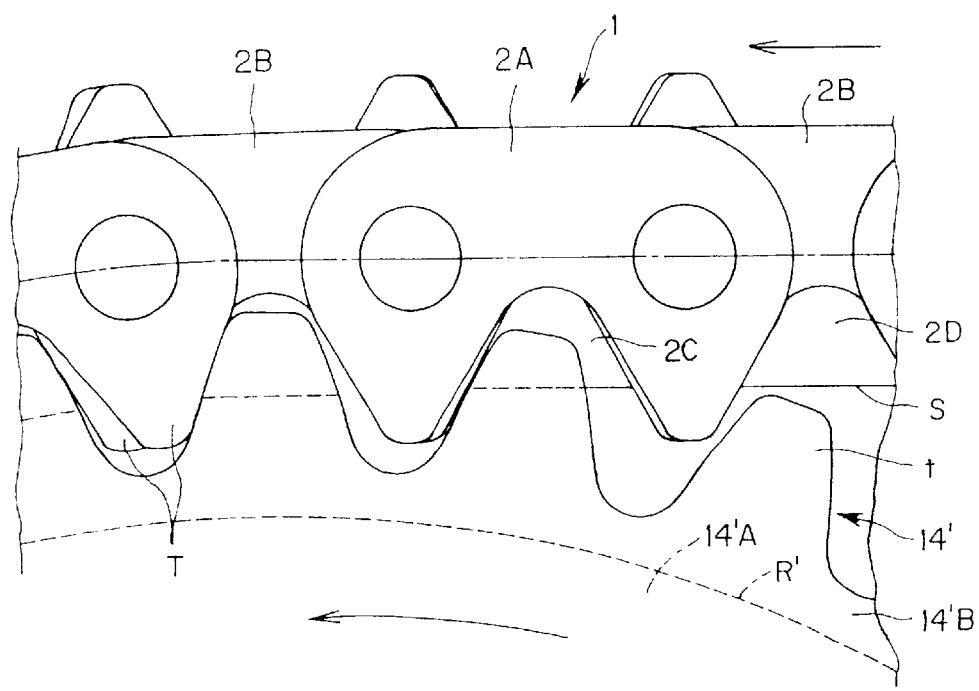
FIG. 11 is a fragmentary side view showing for comparative purposes the condition in which the chain and the sprocket of FIG. 10 are in mesh with each other with the cylindrical outer surface of a plate-back-face support element of the sprocket being separated from the back faces of the link plates of the chain.

FIG. 11 shows for comparative purposes the condition in which due to its smaller outside diameter than the cylindrical surface R shown in FIG. 10, a cylindrical outer surface R' of the plate-back-face support element 14'A of the sprocket 14' is separated from the back faces S of the link plates 2C, 2D. Under such condition, when the chain 1 moves into meshing engagement with the sprocket 14', tooth faces of the meshing teeth T of the link plates 2A, 2B are wedged between the tooth faces of the meshing teeth t of the sprocket 14' by a tension acting on the chain 1. This engagement creates a great stress in the vicinity of the respective tooth faces of the meshing teeth t, T which will result in accelerated wear of the meshing teeth t, T and generation of great operation noises.

The number of meshing teeth T of the chain 1 which are concurrently meshed with the meshing teeth t of the sprocket 14' is smaller on the outer circumference side than on the inner circumferential side of the chain 1. Accordingly, in order to reduce the load to be born by the meshing teeth t, T, it is desirable that when the chain 1 is moved into meshing engagement with the sprocket 14', the cylindrical outer surface R of the plate-back-face support element 14'A lifts up the back faces S of the link plates 2C, 2D and thus displaces the meshing position between the meshing teeth T of the chain 1 and the meshing teeth t of the sprocket 14' in a radial outward direction of the pitch circle P, as shown in FIG. 10.

Figure 12:
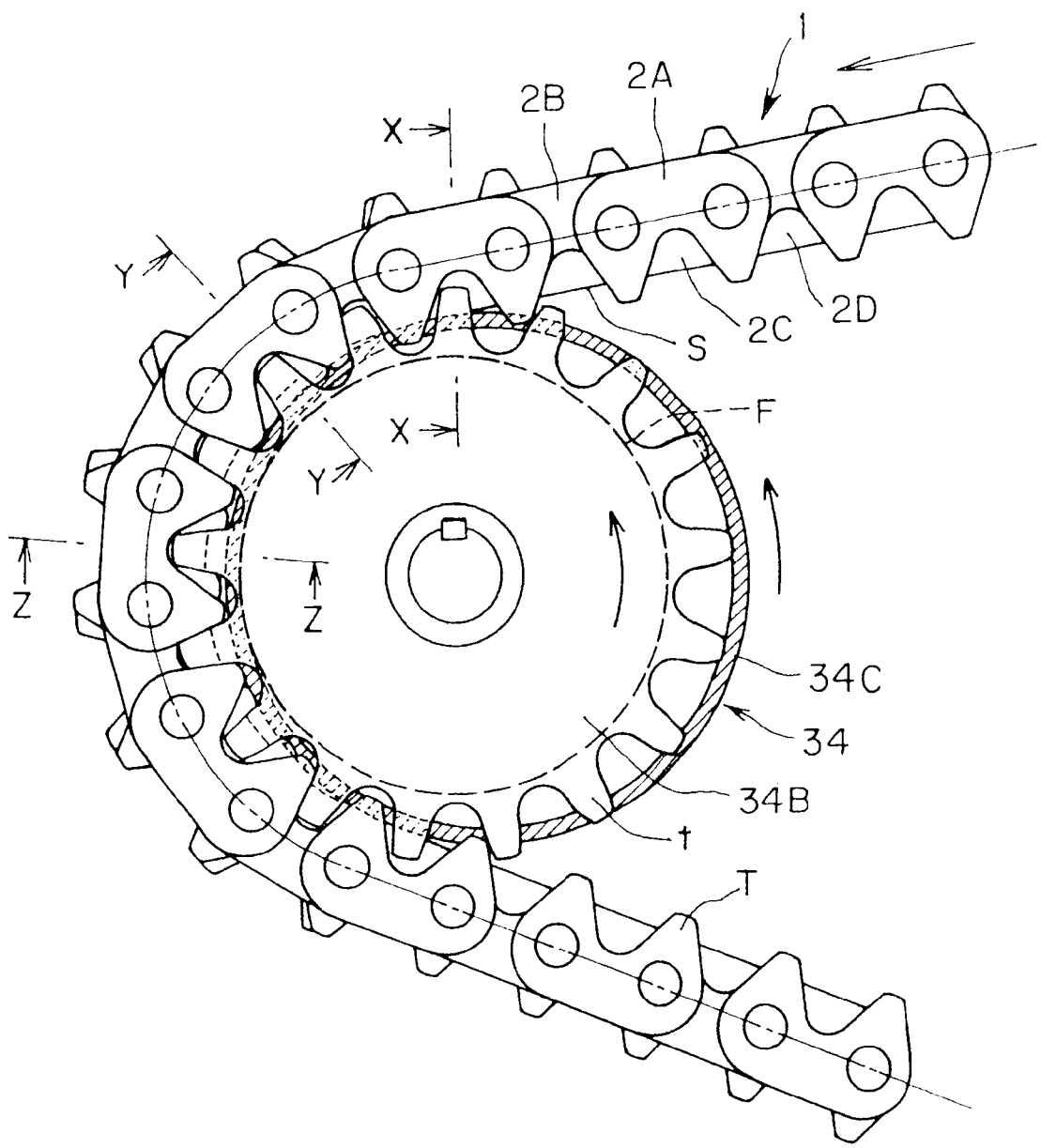
FIG. 12 is a fragmentary side view showing a sixth embodiment of the sprocket according to the present invention which is in mesh with a double-meshing-type silent chain along the outer circumference thereof.
Figure 13A:
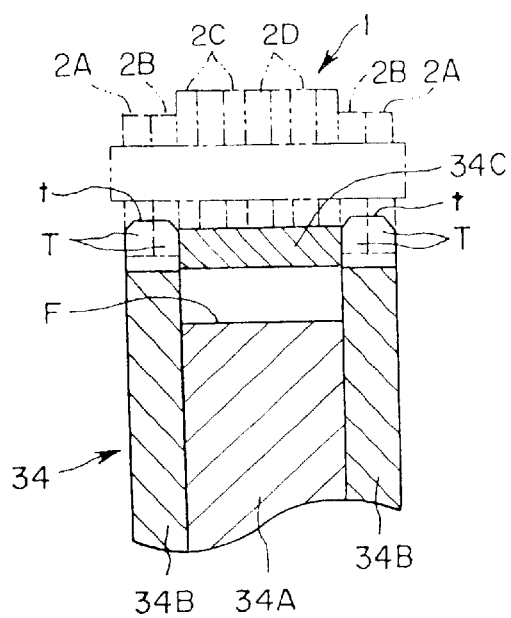
FIG. 13A is a partially sectional view taken along the line X—X of FIG. 12.
Figure 13B:
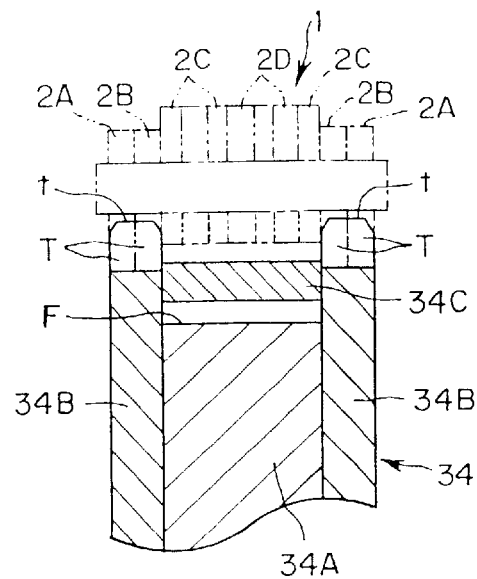
FIG. 13B is a partially sectional view taken along the line Y—Y of FIG. 12.
Figure 13C:
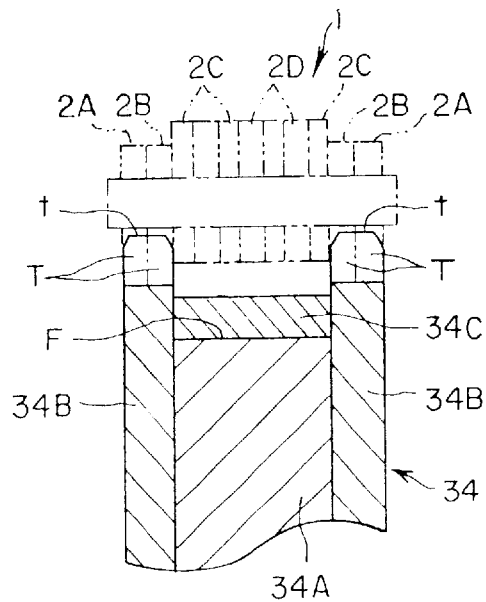
FIG. 13C is a partially sectional view taken along the line Z—Z of FIG. 12.

FIG. 12 is a side view showing a sixth embodiment of the sprocket according to the present invention for meshing with a double-meshing-type silent chain. FIGS. 13A, 13B and 13C are partially sectional views taken along the line X—X, Y—Y and Z—Z, respectively, of FIG. 12. A sprocket 34 shown in these figures includes a buffer-ring support element 34A having a cylindrical outer surface F, and a pair of meshing elements 34B connected integrally with opposite sides of the buffer-ring support element 34A.

The meshing elements 34B are concentric with the buffer-ring support element 34A and each have meshing teeth t formed on the circumference of the meshing element 34B for meshing engagement with teeth T of link plates 2A, 2B projecting toward the outer circumference side of the chain 1.

The outer surface F of the buffer-ring support element 34A has an outside diameter which is slightly smaller than a root circle of the meshing teeth t formed on the respective circumferences of the meshing elements 34B. A buffer ring 34C is floatingly fitted around the outer surface F of the buffer-ring support element 34A.

As shown in FIG. 12, when the chain 1 is in mesh with the sprocket 34 along the outer circumference thereof, the buffer ring 34C is forced on its outer peripheral surface by the flat back faces S of the link plates 2C, 2D so that the center of the buffer ring 34C is offset from the center of the sprocket 34 until an inner peripheral surface of the buffer ring 34C is held in abutment with the outer surface F of the buffer-ring support element 34A along its circumferential portion extending in the vicinity of the line Z—Z position of FIG. 12 so as to achieve a line contact state between the buffer ring 34C and the buffer-ring support element 34A.

When the chain 1 moves into meshing engagement with the sprocket 34, the outer peripheral surface of the buffer ring 34C comes in contact with the flat back faces D of the link plates 2C, 2D at the X—X line position of FIG. 12 before the meshing teeth T of the left and right outermost link plates 2A and 2B of the chain 1 mesh with meshing teeth t of the pair of meshing elements 34B, as shown in FIG. 13A.

In this instance, since the buffer ring 34C is in abutment with the outer surface F of the buffer-ring support element 34A under the line-contact state or condition along its limited circumferential portion, the buffer ring 34C, upon abutment with the flat back faces S of the link plates 2A, 2B, is readily able to flex or otherwise deform in a floating manner around the buffer-ring support element 34A to thereby absorb impact energy at collision between the buffer ring 34C and the link plates 2A, 2B. The impact can thus be relieved.

At the line Y—Y position of FIG. 12, as shown in FIG. 13B, the outer surface of the buffer ring 34C is spaced from the back faces S of the link plates 2C, 2D. In place of this spacing, the meshing teeth T formed on the outermost link plates 2A, 2B are in mesh with and thus supported by the meshing teeth t of the meshing elements 34B of the sprocket 34.

After passing through the line Z—Z position of FIG. 12, the outer surface of the buffer ring 34C comes again in contact with the back faces S of the link plates 2C, 2D and forces the chain 1 in a radial outward direction of the sprocket 34 to thereby disengage the meshing teeth T of the chain 1 from the meshing teeth t of the sprocket 34.

During that time, the buffer ring 34C while rotating in unison with the sprocket 34 catches or takes thereinto a lubricating oil supplied externally and subsequently feeds the lubricating oil between the mutually intermeshing teeth t, T of the sprocket 34 and chain 1.

The buffer ring 34C is formed from a metallic material such as steel in view of the strength. To provide an improved impact relieving effect and a reduced operation noise, the surface of the buffer ring 34C may be covered with a coating layer of rubber or resin material. The buffer ring 34C as a whole may be formed from a non-metallic material such as rubber or synthetic resin provided that the desired strength can be maintained.

Figure 14:
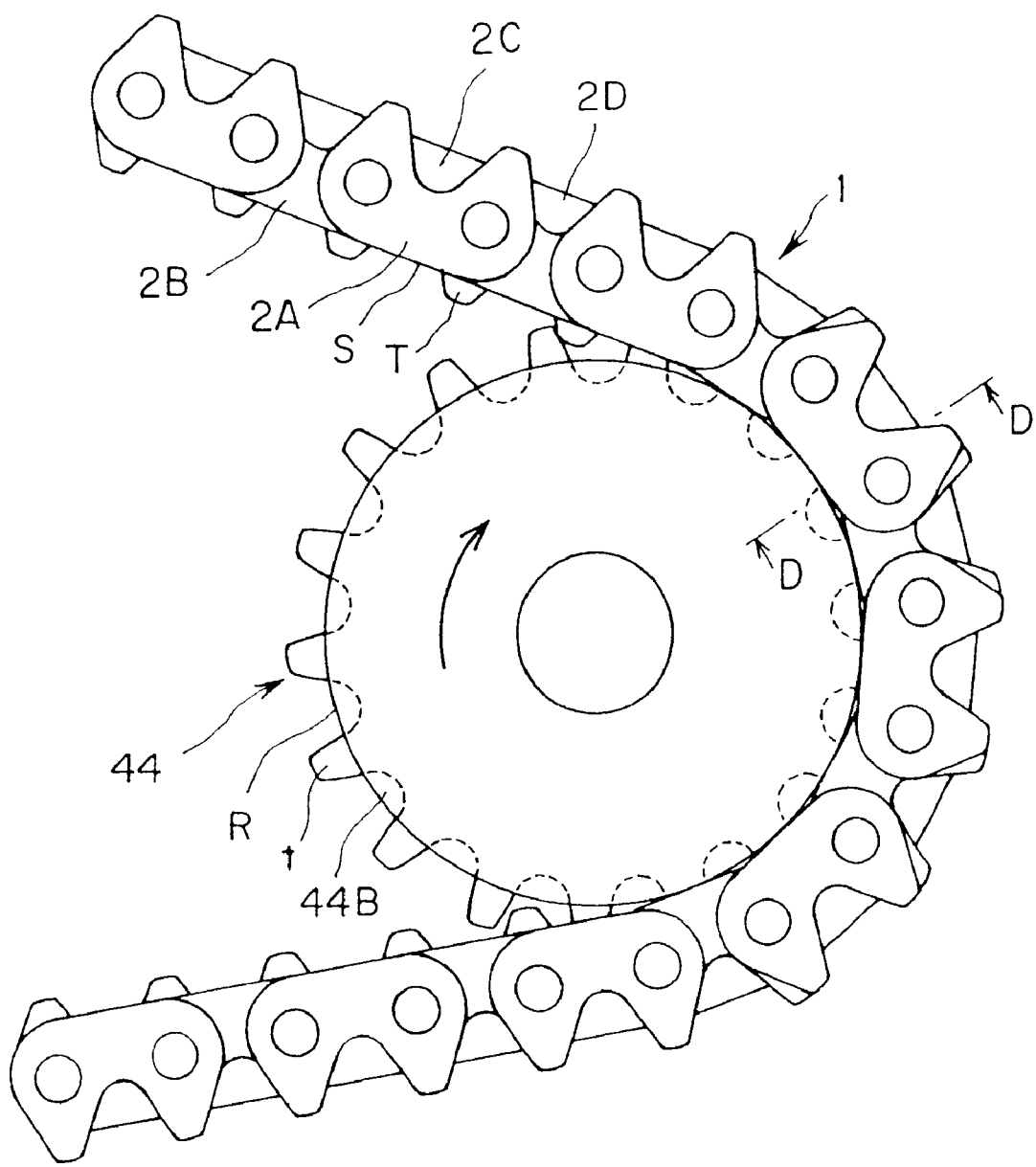
FIG. 14 is a fragmentary side view showing a seventh embodiment of the sprocket according to the present invention which is in mesh with a double-meshing-type silent chain along the inner circumference thereof.
Figure 15:
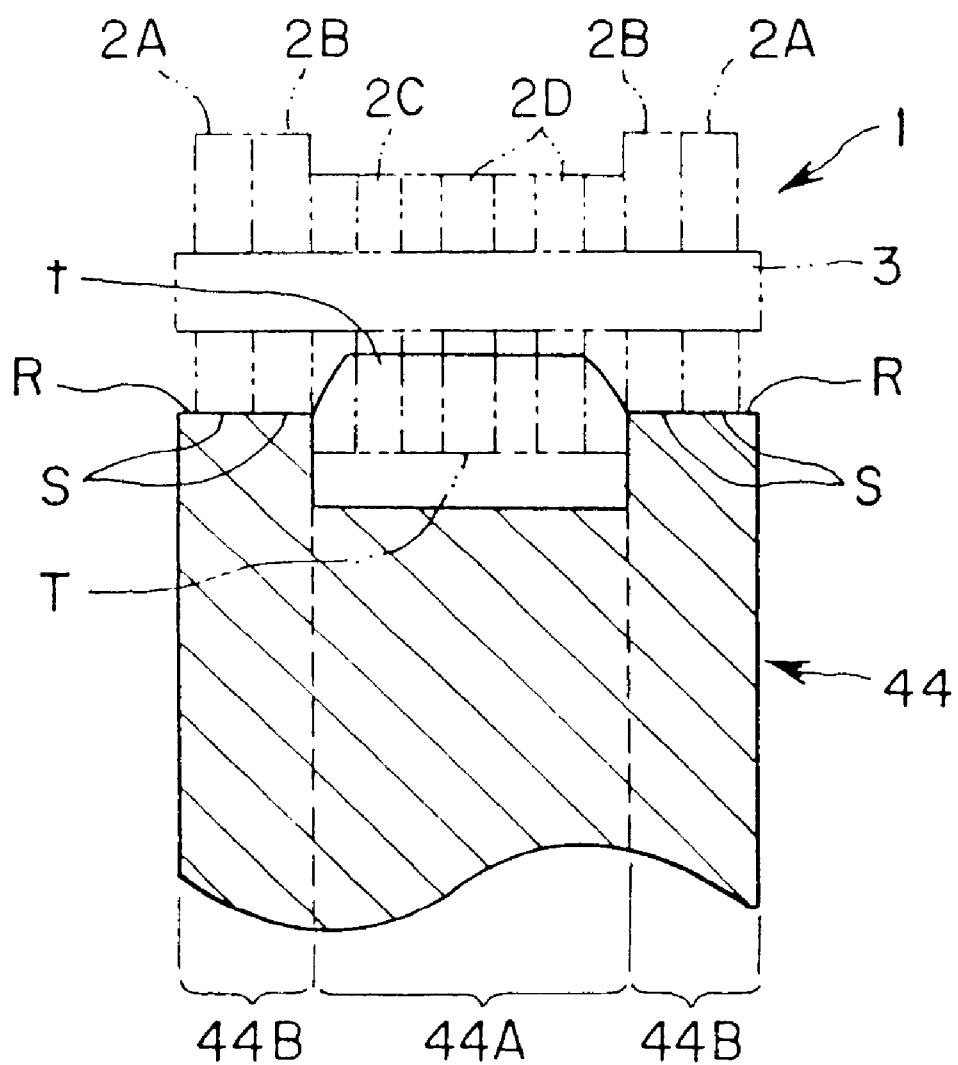
FIG. 15 is a partially sectional view taken along the line D—D of FIG. 14.

FIG. 14 is a fragmentary side view showing a seventh embodiment of the sprocket according to the present invention which is in mesh with a double-meshing-type silent chain along the inner circumference thereof. FIG. 15 is a partially sectional view taken along the line D—D of FIG. 14.

A sprocket 44 in this embodiment includes a meshing element 44A having meshing teeth t formed on its circumference for meshing engagement with meshing teeth T of the chain 1 which are oriented toward the inner circumference side of the chain 1, and a pair of plate-back-face support elements 44B disposed on opposite sides of the meshing element 44a in concentric relation to the meshing element 44a. The plate-back-face support elements 44B each have a cylindrical outer surface R.

The cylindrical outer surfaces R of the plate-back-face support elements 44B have a diameter slightly smaller than the diameter of an addendum circle of the meshing teeth t of the sprocket 44, so that when the meshing teeth T of the chain 1 come in meshing engagement with the meshing teeth t of the sprocket 44, the cylindrical outer surfaces R abut on the flat back faces S of the outermost link plates 2A, 2B in each link of the chain 1. Thus the cylindrical outer surface R of the plate-back-face support elements 44B supports or bears a load applied from the chain 1 in a radial inward direction and suppresses vibration of the chain 1.

The diameter of the respective cylindrical outer surfaces R of the plate-back-face support elements 44B is preferably determined such that when the cylindrical outer surfaces R are in abutment with the back faces S of the link plates 2A, 2B, the meshing teeth t of the sprocket 44 are in mesh with the meshing teeth T of the link plates 2C, 2D on a radial outward side of the meshing pitch circle of the meshing teeth t.

With this arrangement, before the meshing teeth T of the chain 1 come into meshing engagement with the meshing teeth t of the sprocket 44, the cylindrical outer surfaces R of the plate-back-face support elements 44B lift up the back faces S of the link plates 2A, 2B and thus displace the back faces S in a radial outward direction. With this displacement of the link plates back faces S, since the meshing teeth t of the sprocket 44 mesh with the meshing teeth T of the chain 1 on the outside of the meshing pitch circle, a load acting between the meshing teeth t of the sprocket 44 and the meshing teeth T of the chain 1 in a radial direction can be considerably reduced.

Although in the illustrated embodiment the meshing element 44A and the plate-back-face support elements 44B are formed integrally from a single material, they may be produced separately from each other and then assembled together to form a sprocket.

Figure 16:
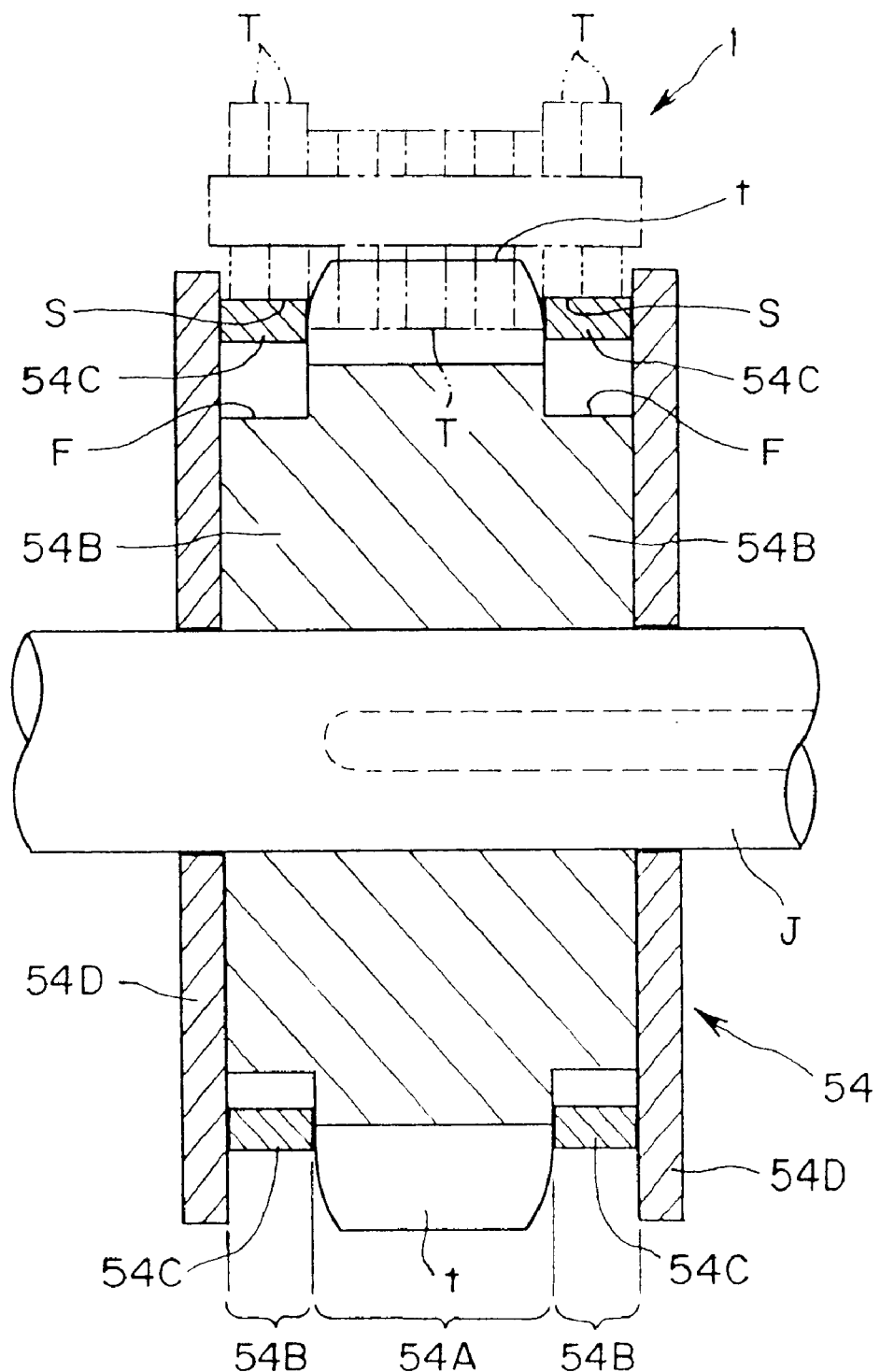
FIG. 16 is a sectional view showing an eighth embodiment of the sprocket according to the present invention which is in mesh with a double-meshing-type silent chain along the inner circumference thereof.
Figure 17:
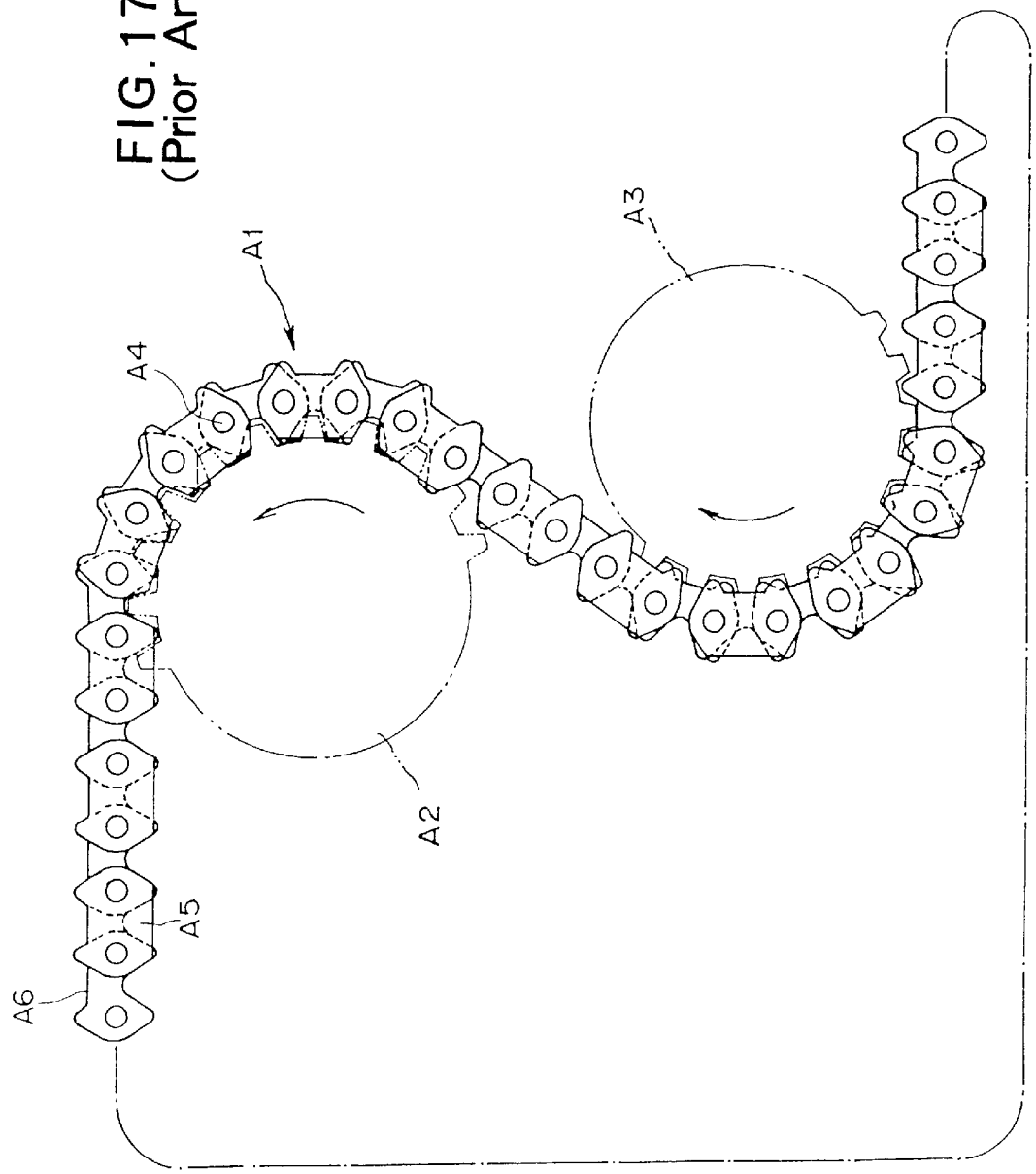
FIG. 17 is a view showing a conventional double-meshing-type silent chain.
Figure 18:
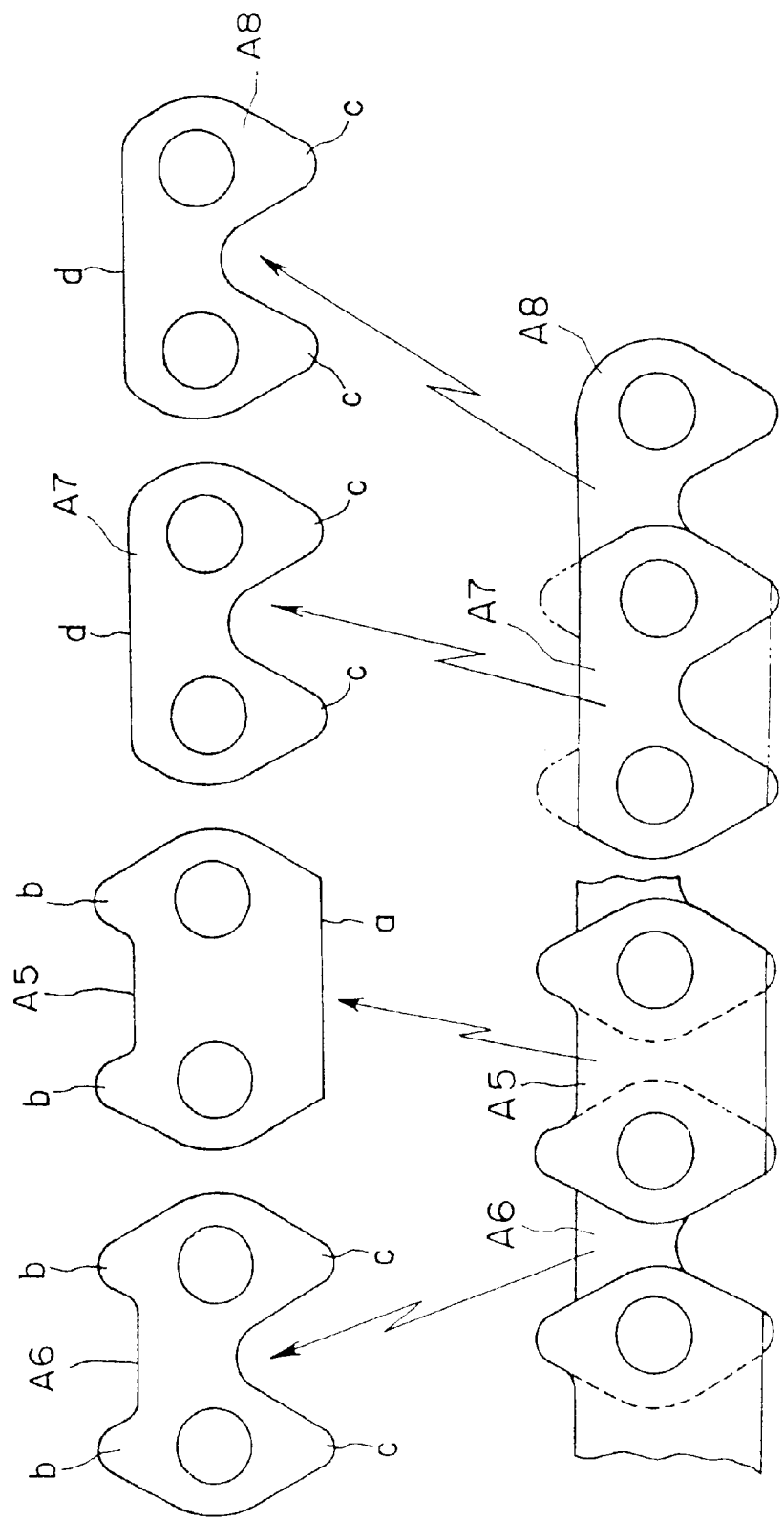
FIG. 18 is a view showing a link plate configuration of the silent chain of FIG. 17.

FIG. 16 is a sectional view showing an eighth embodiment of the sprocket according to the present invention which is in mesh with a double-meshing-type silent chain along the inner circumference thereof. A sprocket 54 of this embodiment includes a meshing element 54A having meshing teeth t formed on its circumference for meshing engagement with meshing teeth T of link plates 2C, 2D of the chain 1, and a pair of buffer-ring support elements 54B provided concentrically on opposite sides of the meshing element 54A and each having a cylindrical outer surface F.

A buffer ring 54C has an inside diameter larger than the outside diameter of the buffer-ring support elements 54B and is floatingly fitted around each of the buffer-ring support elements 54B. An anti-displacement flange 54D is attached to each of the opposite end faces of the buffer-ring support elements 54B so as to prevent displacement of each buffer ring 54C in the axial direction of the sprocket 53 between one of the anti-displacement flanges 54D and the meshing element 54A.

In the sprocket 54 of this embodiment, the buffer rings 54C provided on opposite sides of the meshing teeth 54A operate in the same manner as the buffer ring 34C of the sprocket 34 of the sixth embodiment shown in FIGS. 12 and 13A–13C and thus can absorb collision between the mutually intermeshing surfaces when engagement between the meshing teeth t of the sprocket 54 and the meshing teeth T on the inner circumference side of the chain 1 occurs.

Although in the illustrated embodiment the anti-displacement flanges 54D are attached to the opposite end faces of the buffer-ring support elements 54B to prevent the buffer rings 54C from displacing off the buffer-ring support elements 54B, the anti-displacement flanges 54D may be attached to a rotating shaft J in sandwiching relation to the sprocket 54 which is mounted on the rotating shaft J.

Obviously, numerous modifications and variations of the present invention are possible in light of the above teachings. It is therefore to be understood that within the scope of the appended claims, the present invention may be practiced otherwise than as specifically described herein.

What is claimed is:

1. A double-meshing-type silent chain drive comprising:
    a double-meshing-type silent chain including
        first links and second links alternately arranged in the longitudinal direction of said chain, each of said first links being composed of an odd member of link plates disposed in the width direction of said chain, and each of said second links being composed of an even number of link plates disposed in the width direction of said chain, and
    a plurality of pins each adapted to connect adjacent two links with each other, wherein
        the link plates of said first links and the link plates of said second links have an identical side profile such that two meshing teeth are formed at one side and a flat back face is formed at the opposite side, and the link plates in each of said first and second links are oriented such that the meshing teeth of link plates located at widthwise opposite ends project outwardly with respect to the chain and the meshing teeth of the remaining link plates project inwardly with respect to the chain; and a sprocket for meshing with a double-meshing-type silent chain, said sprocket including a plate-back-face support element having a cylindrical outer surface for abutment with said flat back faces of the link plates of the chain that are oriented inwardly with respect to the chain, and two meshing elements provided concentrically on opposite sides of said plate-end-face support element and each having meshing teeth formed on an outer circumference thereof for meshing engagement with said meshing teeth of said link plates of the chain which are oriented outwardly with respect to the chain, wherein when said cylindrical outer surface of said plate-back-face support element is in abutment with the flat back faces of the link plates, said meshing teeth of each of said meshing elements mesh with the meshing teeth of the opposing link plates at a position offset from a meshing pitch circle of said meshing teeth of said meshing elements in a radial outward direction of said sprocket.

2. A double-meshing-type silent chain drive according to claim 1, wherein, in each link, the meshing teeth of some link plates oriented in one direction project beyond the back faces of the remaining link plates oriented in an opposite direction.

3. A sprocket for meshing with a double-meshing-type silent chain, comprising:

a plate-back-face support element having a cylindrical outer surface for abutment with flat back faces of link plates of the chain that are oriented outwardly with respect to the chain; and two meshing elements provided concentrically on opposite sides of said plate-end-face support element and each having meshing teeth formed on an outer circumference thereof for meshing engagement with meshing teeth of link plates of the chain which are oriented inwardly with respect to the chain, wherein said cylindrical outer surface of said plate-back-face support element is in abutment with the flat back faces of the link plates, with the cylindrical outer surface of the plate-back-face support element having an outer diameter greater than a meshing pitch circle of the meshing teeth of each of the meshing elements of the sprocket, and said meshing teeth of each of said meshing elements mesh with the meshing teeth of the opposing link plates at a position offset from the meshing pitch circle of said meshing teeth of said meshing elements in a radial outward direction of said sprocket.

* * * * *